Oct. 18, 1960  C. W. CLINE ET AL  2,957,092
ULTRASONIC TEST APPARATUS
Filed Dec. 4, 1958  2 Sheets-Sheet 1

INVENTORS
CHARLES W. CLINE
SELMER G. VON STOCKER
BY
ATTORNEY

Oct. 18, 1960 C. W. CLINE ET AL 2,957,092
ULTRASONIC TEST APPARATUS
Filed Dec. 4, 1958 2 Sheets-Sheet 2

INVENTORS
CHARLES W. CLINE
SELMER G. VON STOCKER
BY
Peter L. Coster
ATTORNEY

United States Patent Office 2,957,092
Patented Oct. 18, 1960

2,957,092

ULTRASONIC TEST APPARATUS

Charles W. Cline, Arnold, and Selmer G. Von Stocker, Pittsburgh, Pa., assignors to Aluminum Company of America, Pittsburgh, Pa., a corporation of Pennsylvania Filed Dec. 4, 1958, Ser. No. 778,132

3 Claims. (Cl. 310—8.7)

This invention relates to ultrasonic testing apparatus for coupling ultrasonic waves between a piezoelectric material and a test object, through a liquid coupling medium. More particularly, it is directed to a liquid coupling apparatus which permits inspection up to the edges of the test object.

Ultrasonic inspection techniques have been finding more widespread application with advances and refinements in equipment. However, for more critical inspection, especially of thinner cross-sections or of the metal close to the surface, a liquid coupling medium has been necessary to provide a time delay in the reflection of the ultrasonic waves and to eliminate abrasion of thin piezoelectric materials, which may be quartz crystals or lithium sulfate and barium titanate artifacts.

The prevalent commercial method utilizing a liquid coupling medium requires the immersion within a tank of the body to be tested. A search tube containing the transducer (search unit) is passed over the object and flaws are located.

This immersion method has definite disadvantages in that large tanks are required and time is consumed in transferring the objects into and from the tanks. It has heretofore been proposed to use apparatus which would provide a self-contained coupling medium. However, these devices have been unsatisfactory for inspection of the object close to its edges. Furthermore, spurious indications would appear on the oscilloscope due to disturbances in the coupling medium, generally caused by entrapped air or rapid flow of coupling medium between the piezoelectric transducer and test object.

It is an object of this invention to provide an apparatus for coupling ultrasonic waves through a self-contained liquid coupling medium which will enable inspection up to the edges of a test object.

It is also an object to provide an apparatus for coupling ultrasonic waves which may be utilized for both general surface inspection and inspection up to the edges of the test object while also maintaining the coupling medium substantially quiescent between the piezoelectric material and test object.

Other objects and advantages to this invention will be readily apparent from the following detailed specification and accompanying drawings, in which.

Figure 1:
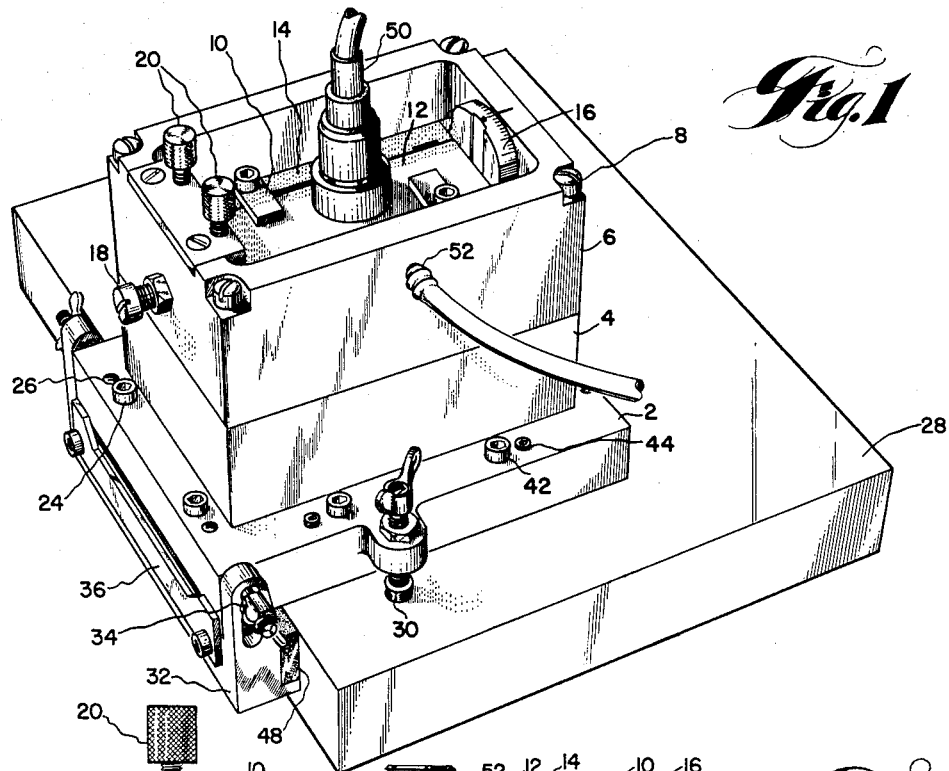
Fig. 1 is a perspective view of apparatus constituting an embodiment of the invention, as applied to a test object.
Figure 2:
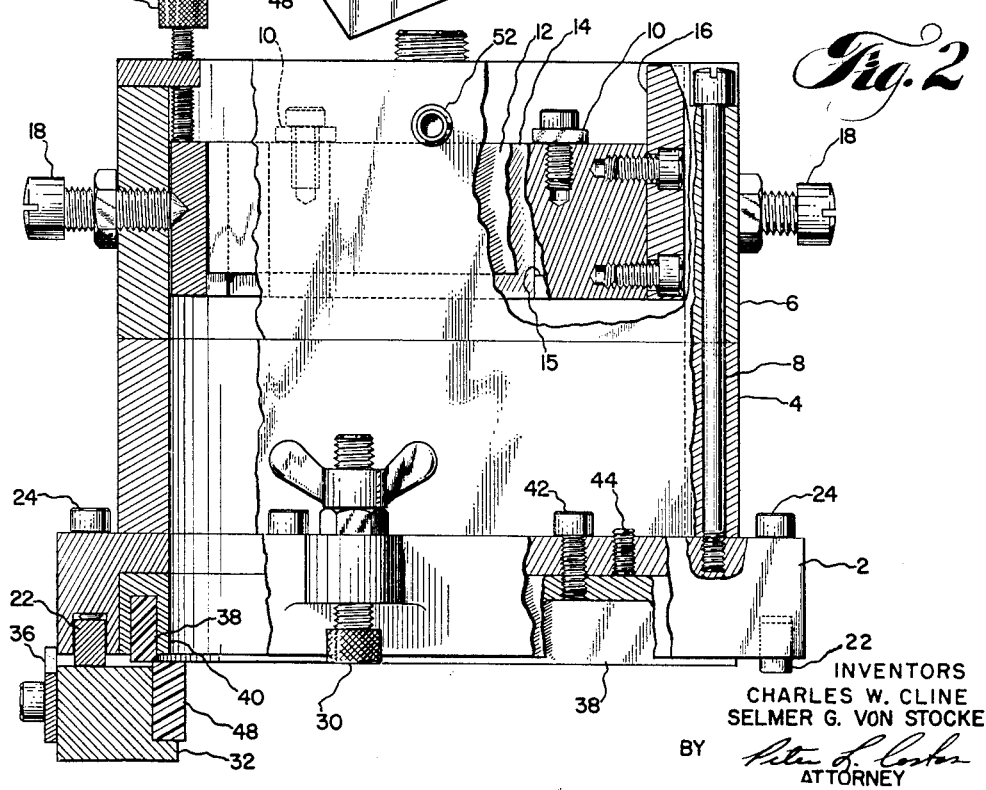
Fig. 2 is a front elevational view in partial section of the apparatus of Fig. 1, with the side-sealing extension in its operative position.
Figure 3:
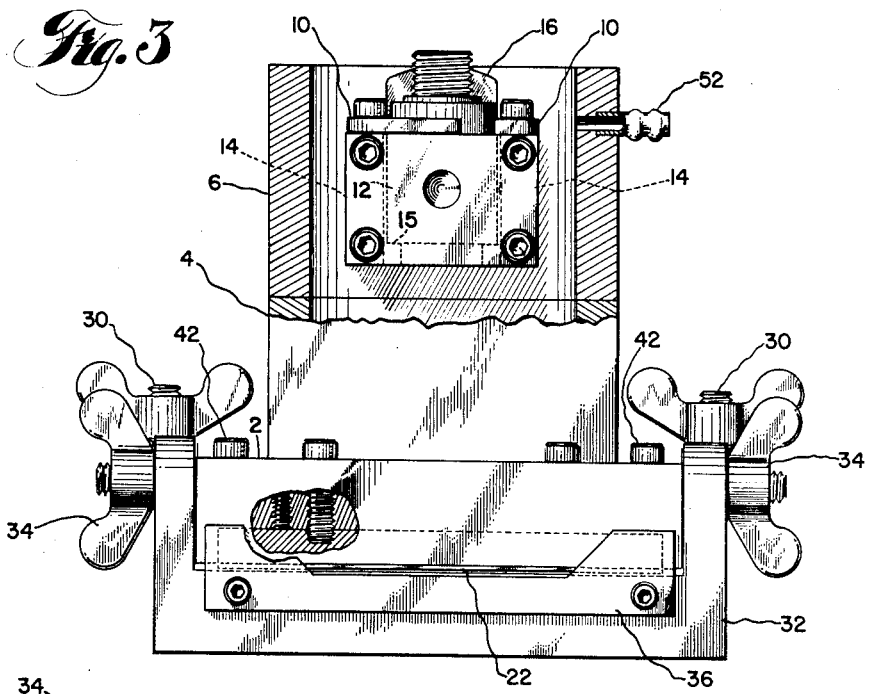
Fig. 3 is an end elevational view in partial section.
Figure 4:
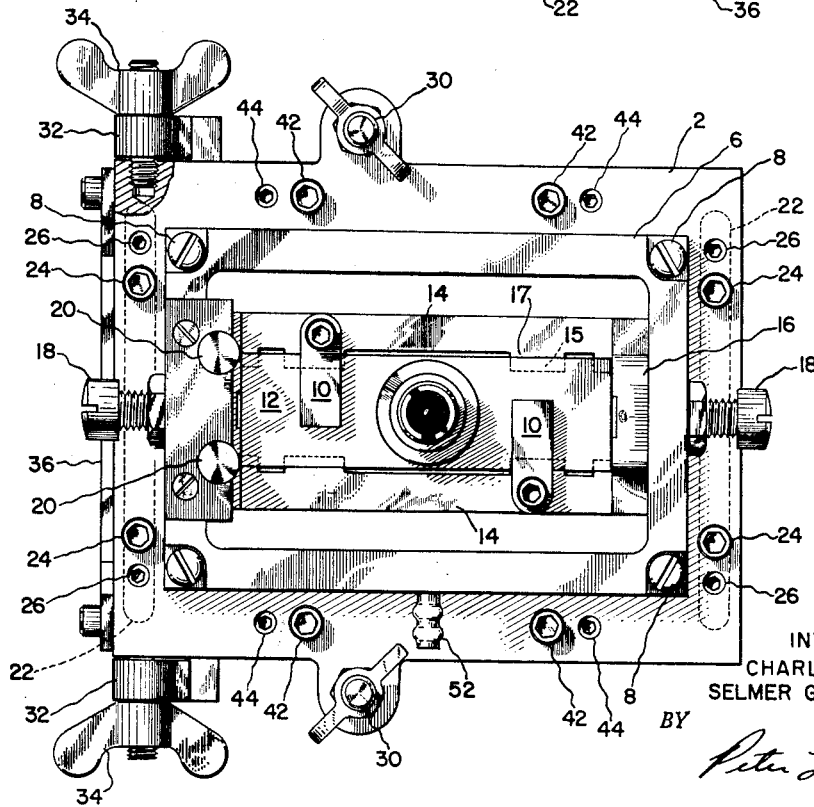
Fig. 4 is a top plan view with a section of the base member broken away to reveal the pivotal mounting of the side-sealing extension.

The present invention contemplates apparatus in which the ultrasonic transducer is mounted within a housing having a seal about the periphery of its open base and an auxiliary side-sealing extension extending downwardly from the base having a seal in its inner surface adapted to bear upon the side surface of a test object and to contact the adjacent portions of the seal in the periphery of the base so as to substantially prevent leakage of coupling medium during operation of the apparatus.

In its preferred form, the side-sealing extension is pivotably joined to the base so that it may be swung upwardly to permit use of the apparatus for general inspection of a plan surface. The transducer is also pivotably mounted for angulation of the transducer in the housing, thus enabling correction for vertical orientation as well as permitting use of the unit for scanning the object with the sonic beam at an angle deviating from normal to the front surface.

The coupling medium must be maintained at a level above the front surface of the piezoelectric material and the transducer is preferably so mounted in the holder that channels or spaces are provided about its periphery for escape of air bubbles from the surface of the piezoelectric material.

Referring now to the attached drawings, a coupling device constructed in accordance with the present invention is illustrated, wherein the housing is comprised of a base section 2, spacer section 4 and a top section 6, thereby permitting variation in the height of the couplant column by using various sizes of spacer sections 4, or by omission thereof. The several sections are joined together by the locking screws 8.

Clips 10 fasten the ultrasonic transducer 12 into a holder 14, wherein it rests upon shoulders 15. Ribs 17 in the holder 14 space the transducer from the holder 14 so as to provide channels or spaces about the periphery which permit the escape or washing away of air from the piezoelectric material in the bottom of the transducer 12. The holder may be provided at one end with an end piece 16 having markings indicating angular displacement, if such displacement is desired. The holder 14 is preferably pivotably mounted in the top section 6, conveniently by means of the bearing screws 18, thus enabling adjustment or angulation of the search unit 12. The holder 14 may be pivoted by means of the adjustment screws 20.

Bearing shoes or slides 22, which are locked into the ends of the base section 2 by the set screws 24 and adjustable by the slide adjustment screws 26, support and carry the device along the surface of the test object 28. Adjustable bearing screws 30 also are preferably provided in the sides of the base section 2, although shoes or slides may also be used. The several bearing devices are preferably of stainless steel or other suitable material.

The side-sealing extension 32 is pivotably affixed to the base section 2 by the wing fasteners 34, and is aligned in a vertical position by the guide 36. For inspection of an interior or general plan surface, the extension 32 may be pivoted into an upright position, out of the way.

A suitable sealing gasket 38, such as cellular polyvinyl chloride, is friction fit into a gasket holder 40, which is then locked into the base section 2 by the holder screws 42. The gasket 38 is adjustable for wear by means of the gasket screws 44, which bear down upon the holder 40.

The side-sealing extension 32 is also provided with a sealing gasket 43 which, when the extension 32 is in its operative position, bears upon the side surface of the test object and upon the adjacent portions of the gasket 38 of the base section 2 to substantially prevent couplant loss.

In the operation of the apparatus, a suitable couplant may be introduced into the housing through the inlet 52 from a reservoir, although the couplant may also be poured into the top of the housing. The couplant level is maintained above the level of the front surface of the transducer and preferably slightly above the top of the holder 14. Electrical energy is received by and sent from the piezoelectric crystal of the search unit 12 through the coaxial cable 50.

The holder 14 containing the ultrasonic transducer 12 may be pivoted or angulated so as to enable alignment of the piezoelectric material and the sonic beam generated thereby. Furthermore, the holder may be angulated for inspection of the test object with the sonic beam at an angle deviating from normal to the front surface. The degree of angulation may be observed by the alignment of the scribe line on the housing and the degree lines scribed on the end piece 16.

This apparatus has been found most valuable in the inspection of plate, hand forgings, bar and extrusions wherein it is desired to inspect a plan surface. The unit may be utilized for the inspection of the general or interior surface area by pivoting the side-sealing extension into an upright position and then, by pivoting the extension into its operative or downward position, may be used to inspect the surface adjacent the edges. Since there is substantially no loss of coupling medium during operation, the problem of noise or hash on the oscilloscope due to turbulence in the medium is eliminated, and the device further prevents entrapment of air bubbles at the surface of the piezoelectric crystal.

Having thus described the invention, we claim:

1. An ultrasonic coupling apparatus for transmitting ultrasonic waves through a liquid coupling medium between the piezoelectric material of an ultrasonic transducer mounted therein and a test object comprising: a housing having an open base and adapted to contain a column of liquid coupling medium; means for mounting an ultrasonic transducer in said housing; sealing means provided about the periphery of said base adapted to bear upon the upper surface of a test object; auxiliary means extending downwardly from said base adapted to abut the side of a test object; and auxiliary sealing means in said auxiliary means adapted to bear upon the side surface of a test object and upon a portion of said first-mentioned sealing means to prevent leakage of the liquid coupling medium during operation of the apparatus.

2. An ultrasonic coupling apparatus for transmitting ultrasonic waves through a liquid coupling medium between the piezoelectric material of an ultrasonic transducer mounted therein and a test object comprising: a housing having an open base and adapted to contain a column of coupling medium; a holder into which an ultrasonic transducer may be mounted; means for pivotally mounting said holder in said housing to permit angular adjustment thereof; housing bearing means for support and movement of the apparatus along the surface of a test object; a seal provided about the periphery of the said base adapted to contact the surface of a test object; an extension pivotally affixed to said housing and adapted to extend downwardly from the said base and along the side of a test object; and an auxiliary seal on the inner face of said extension adapted to bear upon the side of a test object and to contact those portions of said first-mentioned seal adjacent thereto to prevent leakage of coupling medium during operation of the apparatus.

3. An ultrasonic coupling apparatus for transmitting ultrasonic waves through a liquid coupling medium between the piezoelectric material of an ultrasonic transducer mounted therein and a test object comprising: a housing having an open base and adapted to contain a column of coupling medium; a holder into which an ultrasonic transducer may be mounted; means spacing said holder from an ultrasonic transduced mounted therein to provide channels about the periphery of the transducer for escape of air from the front surface thereof; means for pivotally mounting said holder in said housing to permit angular adjustment thereof; housing bearing means for support and movement of the apparatus along the surface of a test object; a seal provided about the periphery of the said base adapted to contact the surface of a test object and prevent loss of coupling medium during operation; an extension pivotally affixed to said housing and adapted to extend downwardly from the said base and along the side of a test object; and an auxiliary seal on the inner face of said extension adapted to bear upon the side of a test object and to contact those portions of said first-mentioned seal adjacent thereto to prevent leakage of coupling medium during operation of the apparatus.

References Cited in the file of this patent
UNITED STATES PATENTS

| | | |
|---|---|---|
| 2,536,128 | Firestone | Jan. 2, 1951 |
| 2,852,707 | Koehms | Sept. 16, 1958 |
| 2,888,581 | Pahud | May 26, 1959 |